Feb. 7, 1956        D. H. JACOBS        2,734,188
MEASURING BY A SERIES OF SIGNALS
Filed July 30, 1951        2 Sheets-Sheet 1
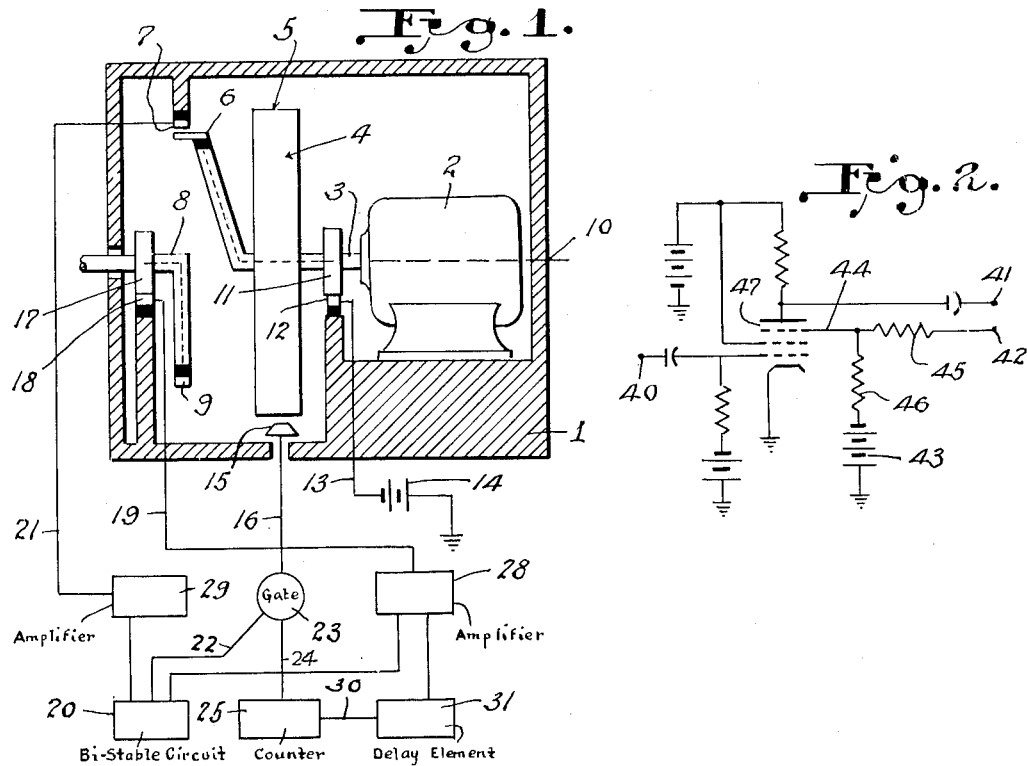
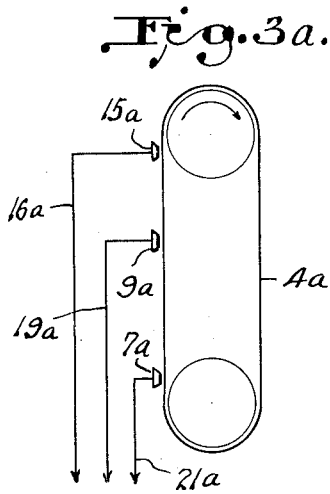
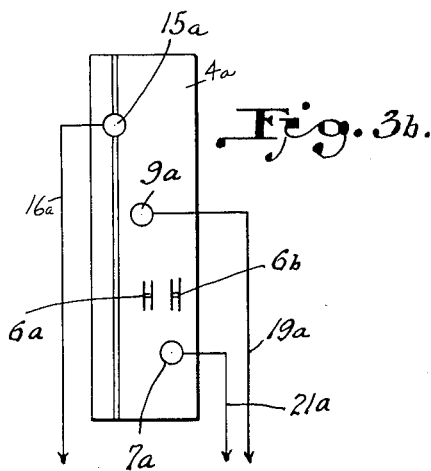
INVENTOR.
Donald H. Jacobs Feb. 7, 1956 D. H. JACOBS 2,734,188
MEASURING BY A SERIES OF SIGNALS
Filed July 30, 1951 2 Sheets-Sheet 2

INVENTOR.
Donald H. Jacobs 2,734,188
Patented Feb. 7, 1956

2,734,188
MEASURING BY A SERIES OF SIGNALS
Donald H. Jacobs, Brookdale, Md.

Application July 30, 1951, Serial No. 239,259

2 Claims. (Cl. 340—206)

This invention comprises a new and improved means and method of measuring variable quantities in terms of a series of signals, the number of signals being proportional to the value of the quantity which is measured. Means are provided to automatically making the measurement and obtaining the result in the form of a series of signals so that it is possible to make the measurement at one point and transmit the resultant value to any distance desired without the need of any human agency at the measuring point.

In one embodiment the invention is used to measure the angle of rotation or the angular position of a rotary shaft. The terms "shaft rotation" and "angle of rotation" will, for the purposes of this specification, be defined as the angle between any given point on, or connected to, but not on the axis of rotation of said shaft, and a reference point (also located off the axis of rotation of the shaft) of any object with reference to which the shaft rotates. This last-named object may itself be fixed or rotatable. The vertex of the said angle is located on the axis of rotation of the shaft, or on a line in prolongation thereof.

It is conventional to indicate the value of a variable quantity (temperature, speed, pressure, etc.) by a shaft rotation. This invention converts said shaft rotation into a series of electrical signals (such as pulses, for example) whose number is proportional to the angle of rotation, and then transmits this series of signals over wire, radio, etc. to indicate the value of the variable at a remote point. Another use of the invention is to use the series of pulses as an input to a digital computing device, thereby conveying useful intelligence as to the magnitude of the shaft rotation to said digital computing device.

The invention will be described in terms of embodiments in which the rotational angle of a shaft is measured with respect to a stationary reference object, the shaft whose angular position is to be determined being fixed or stationary. However, it is within the scope of this invention to employ other embodiments and ramifications of the principles described in this specification. For example, the object which is used as the reference or zero point for the angle measurement may itself be connected to a movable shaft coaxial with the last-named shaft. In this case the measurement would reveal the angle between reference points on the two shafts. The two shafts must be coaxial, and may be positioned so that one shaft is located in prolongation of the other, or one shaft may be located inside the other.

In other embodiments this invention may be used to measure straight line movement, or any movement of a member along a known path by mounting a measuring member to move along a path parallel thereto, as will be obvious from the following description. Also, movement along a curved, non-circular path may be measured by similar embodiments.

While electrical transmission means is described as a preferred embodiment of this invention, the series of signals constituting a measure of the variable quantity can also be transmitted by radio, or by optical or sonic methods without departing from the spirit of this invention.

In the drawings:

Fig. 1 illustrates the invention as applied to the measurement of the angle of rotation of a shaft.

Figs. 3a and 3b show the invention as used for measuring straight line movement.

Fig. 7 is a sectional view showing a modification of Fig. 5.

Figure 4:
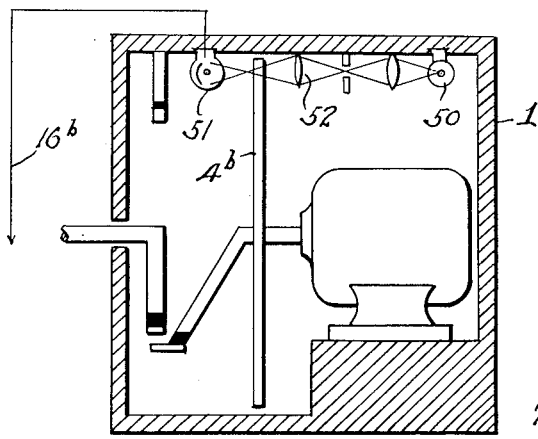
Fig. 4 illustrates a modification in which optical means is used to generate the series of signals.

A representative embodiment of the invention is shown in Fig. 1. In this figure, motor 2 is fastened to frame 1. On the motor shaft 3 is mounted disc 4. This disc (which may, in other embodiments, take the form of a solid or hollow drum, or a hollow drum fastened to a disc) is so constructed that conventional magnetic recording may be performed, by means well known to the art, on its peripheral surface 5. Prior to the use of this invention, there has been recorded on peripheral surface 5, by conventional magnetic recording means, a series of equally spaced pulses, these recorded pulses being located entirely around the periphery. The means for recording these pulses is to be external to, and not a part of, this invention. Hence the invention comprises no recording means. The pulses recorded on the periphery of the disc may have any desired repetitive wave shape (square, rectangular, sinusoidal, etc.).

Fastened to disc 4 is a metallic object 6, and another metallic object 7 is fastened to, but electrically insulated from, frame 1. As disc 4 rotates, metallic object 6 alternately approaches and recedes from object 7. The two metallic objects 6 and 7 form the plates of a variable condenser whose capacitance increases very rapidly as the objects approach one another.

Shaft 8 (which is connected to any object whose rotational angle is to be measured) is the shaft whose rotation is to be measured in terms of a series of pulses. Connected to this shaft, at a position removed from its rotational axis, is metallic object 9. This object, together with metallic object 6, forms another condenser of varying capacitance.

As disc 4 rotates about axis 10, metallic object 6 alternately approaches objects 7 and 9.

On shaft 3 of motor 2 is located a continuance ring 11 of material that can conduct electricity, this being designated a slip ring. Bearing against this slip ring is contact 12 which is mechanically connected to (but insulated from) frame 1. Contact 12 is connected, by means of wire 13, to battery 14. The other end of the battery is connected to ground. Slip ring 11 and object 6 are electrically connected together and are insulated from the parts that support them.

Fastened to frame 1 is magnetic pickup (or reading, or playback) head 15, which is mounted in juxtaposition to the rotating disc in such a fashion that as each magnetically recorded signal on the disc passes by the pickup head, an electrical signal appears in the output of the head, i. e. as an electrical signal on line 16.

On shaft 8 is mounted a continuous slip ring 17 electrically connected to metallic object 9. Slip ring 17 and object 9 are insulated from the parts that support them. Signals from the ring are picked up by brush 18 which is fastened mechanically to frame 1 (but which is electrically insulated from it), and which bears against slip ring 17. The slip rings described in this embodiment may individually or severally be replaced by mercury contacts or other means of transferring electrical energy from a rotating shaft to a stationary platform.

Brush 18 is connected by electrical conductor 19 to amplifier 28. This amplifier may be of the conventional vacuum tube resistance-capacity coupled type. This type of amplifier is well known to the art and needs no further description. This amplifier (though not essential to the invention) makes possible the use of a battery 14 which is of much smaller voltage than would be required without the use of the amplifier, and contributes to the accuracy of determination of the point of nearest proximity of the objects 6 and 7. The output of the amplifier 28 is connected to bi-stable circuit 20. Object 7 is connected to amplifier 29 by wire 21.

For representative circuits which can be used with the invention, reference should be made to "Radar System Engineering" by Louis N. Ridenour (McGraw-Hill, N. Y.). On page 499, Fig. 13.15 (a) shows a bi-stable circuit called a "Flopover." This circuit has two stable states in which either the left hand tube or the right hand tube is conducting, but not both. A negative pulse applied at the point marked "Trigger 1" in this figure will cause the right hand tube to become conducting, with the result that the plate of the right hand tube is at a low potential. A negative pulse applied at "Trigger 2" results in the plate of the right hand tube assuming and remaining at a higher potential. This circuit is the type represented by block 20 of Fig. 1 of this application.

Figure 2:
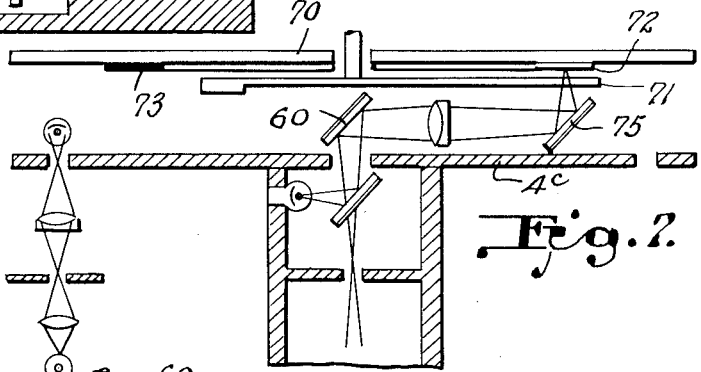
Fig. 2 shows one type of gating circuit used in carrying out the invention.

If reference is now made to Fig. 1 it will be seen that amplifiers 28 and 29 are connected to the bi-stable circuit 20. The outputs of amplifiers 28 and 29 are (in one specific embodiment) connected to "Trigger 1" and "Trigger 2" respectively of Fig. 13.15 of the cited reference. When object 6 passes object 7 a pulse is produced on line 21 as the result of the rapid change of capacity between objects 6 and 7, and because of the D.-C. potential difference existing between these objects which is maintained by the battery 14. This pulse is amplified by amplifier 29 and applied to "Trigger 2" of the bi-stable circuit 20. This results in the plate of the right-hand tube assuming its higher potential. When object 6 later passes object 9, the resulting pulse on line 19 is amplified by amplifier 28 and applied to "Trigger 1" of the bi-stable circuit 20. This results in the right hand tube plate assuming its lower potential. It will be seen that the bi-stable circuit 20 is in one state while the object 6 passes across the interval from object 7 to object 9, and is in the other state for the balance of the revolution of object 6. It will be further seen that during the said interval the right hand tube plate of the bi-stable circuit 20 (see Fig. 13.15 of the cited reference) is at its high potential while during the balance of the revolution of object 6 the right hand tube plate is at its lower potential. When said tube plate is at its higher potential it causes gate 23 to conduct pulses supplied along electrical conductor 16 from the magnetic pickup head 15. When said tube plate is at its lower potential it causes gate 23 to not conduct pulses received down line 16. The number of pulses issuing from gate 23 is therefore a measure of the angular interval between objects 7 and 9. The gate 23 may comprise any type of amplifier whose gain is controllable by application of a variable electrical potential or it may comprise any other suitable gating circuit employing diodes, or saturable reactors, or other suitable devices. A particular example of gate 23 which would be satisfactory is shown in Fig. 2 The signal from the magnetic head on electrical conductor 16 in Fig. 1 is connected to the input 40 in Fig. 2. The output line 24 in Fig. 1 would be connected to point 41 in Fig. 2. The control line 22 of Fig. 1 from bi-stable circuit 20 would be connected to point 42 of Fig. 2. The values of resistances 45 and 46 and the potential of battery 43 of Fig. 2 are so adjusted that when the bi-stable circuit 20 of Fig. 1 is in the state set by amplifier 29, the suppressor grid 44 of the gate circuit Fig. 2 is set at a potential which will cause tube 47 to amplify signals applied at the input point 40, and when the bi-stable circuit of Fig. 1 is in the state set by amplifier 28 the suppressor grid 44 of the gate circuit Fig. 2 is set at a potential which will cause tube 47 to attenuate signals applied at the input. The line 22 is connected to the right plate of the bi-stable circuit previously described. The pulses issuing from gate 23 of Fig. 1 are fed to a conventional counter 25. This may be of any suitable type known to the art and may comprise an electronic type, electro-mechanical type, or a combination of the two. This counter 25 may form part of a digital computer, so that values transmitted to the counter may be used in computations performed by the computer.

A typical electronic counting circuit is shown in Figs. 3-4 on page 18 of the book, "High Speed Computing Devices" written by the staff of Engineering Research Associates, Inc., and published by the McGraw-Hill Book Company in 1950. This circuit counts negative pulses which are applied at the point marked "input." The counter shown in this figure has four stages; any desired number of additional stages may be added. Indicator lamps are provided in the circuit to show the total count reached, and output voltages are also available for indication purposes from each stage at the point marked (A). Additional stages can be added at the point labelled "output."

All stages can be reset rapidly and simultaneously by applying a negative pulse of 100 volts amplitude to the plate of each tube designated "$V_4$."

The reading obtained on the counter 25 is a measure of the angle between objects 7 and 9. It will be seen that if the counter is not set to zero once each revolution before object 6 passes object 7, the angular readings obtained will accumulate in the counter 25. For normal use therefore the counter is cleared once each revolution. A suitable delay device 31 could be triggered by the amplifier 28 when object 6 passes object 9. After a suitable interval determined by the delay device 31, the counter 25 would be cleared by a pulse issuing from delay device 31 along electrical conductor 30. The delay device 31 might comprise a conventional monostable multivibrator as described in "Waveforms" (Chance et al., McGraw-Hill, N. Y.), page 168, Fig. 5.10. External means of controlling the clearing of the counter and timing of the angular measurement may be used.

Metallic object 6 could take the form of a fine wire or brush which made contact with metallic objects 7 and 9 instead of acting as a capacitor plate.

The invention is also capable of use to measure the position of a member moving along a straight line as shown in Figs. 3a and 3b where marker 9a is moved along a vertical line in accordance with the value of some quantity which it is desired to measure. In this modification pulses recorded on the belt 4a are picked up by pickoff 15a to provide the series of pulses. Marker 9a carries a magnetic pickoff and a similar pickoff is mounted at the reference point 7a, these two pickoffs being mounted so as to engage a different zone of travel of the belt. Magnetic pulses 6a and 6b are impressed on the belt so as to pass adjacent pickoffs 9a and 7a respectively. Lines 19a and 21a are connected as in Fig. 1 so that impulses on line 16a from 15a are passed to the counter only during the time that the pulses 6a and 6b are moving from reference point 7a to marker 9a.

There are many other variations of the invention. For example, as shown in Fig. 4, the rotating drum 4 containing the magnetically recorded pulses on its periphery can be replaced with a disc 4b of transparent material (glass, for example). On one face of this transparent material could be located a ring of equally spaced alternate opaque and transparent spaces. Or the disc could be entirely of metal with equally spaced openings around its outer portion. Light source 50 mounted on frame 1 on one side of disc 4b is arranged so that light from the lamp can pass through the transparent spaces to the photocell 51 fastened to the frame 1 on the other side of the disc. An optical system 52 between the lamp and the disc is so designed that light passes to the photocell through one transparent space at a time as the disc rotates and is prevented from reaching the photocell by each opaque space in turn. Signals from the photocell along line 16b are controlled by an arrangement similar to that shown in Fig. 1, so these signals reach the transmission line 24 (Fig. 1) only during that part of a disc rotation which corresponds to the distance from the object 9 on shaft 8 to the reference point. In this embodiment the photocell (and generally an associated amplifier) replaces pickup head 15.

One of the advantages of this system is that its accuracy does not require that the disc travel at a uniform speed. Since the openings, pulses or other differentially characterized portions are equally spaced around the disc, the rotation of the disc through a given number of degrees will always produce the same number of pulses, regardless of the speed of rotation of the disc. There is, therefore, no need of providing mechanism to insure that the disc shall always travel at a constant speed.

Figure 6:
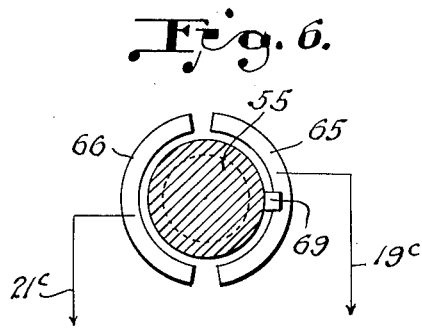
Fig. 6 is a sectional view on line VI—VI of Fig. 5.
Figure 5:
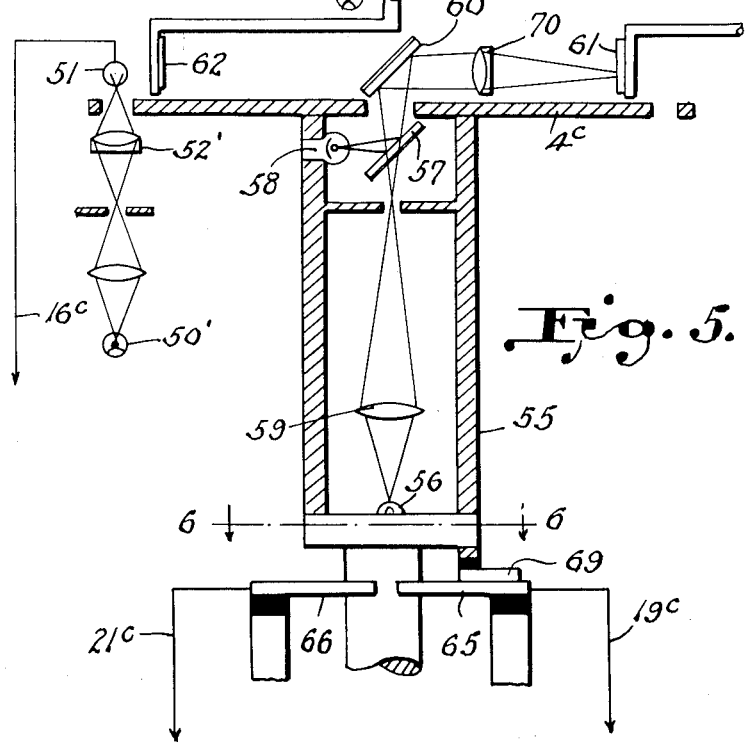
Fig. 5 shows an optical system in which a beam of light is used in measuring the distance from the moving object to the reference point.

Figs. 5 and 6 show an arrangement in which the objects 7 and 9 are replaced by mirrors. Light 50' and optical system 52' activate photocell 51' intermittently through transparent portions in the disc 4c producing a series of signals along line 16c. Disc 4c has a hollow hub 55 in which are housed light 56, half-silvered mirror 57, photocell 58, and lens system 59. In line with the center of disc 4c is mounted mirror 60 positioned to reflect rays from light 56 outwardly parallel to the face of the disc. Light rays from light 56 pass through the hub and are reflected outwardly through lens system 70 mounted on the disc, making a rotating spot of light. As this spot of light passes mirror 61 placed at the reference point, the light is reflected back to mirror 60, down to half-silvered mirror 57 and thence to photocell 58 which is thus actuated to give a signal indicating passage of the reference point. As the disc in its rotation causes the spot of light to pass mirror 62 on the rotary shaft a signal is given in the same way by reflection of the light back to photocell 58, indicating passage of the object corresponding to 9 in Fig. 1, on the rotary shaft.

So far, there is nothing to distinguish these two signals, but in pratice they must be distinguished. One mode of distinguishing them is shown. This can be used on many measuring instruments where the possible range of movement of the rotary shaft is not too great. Hub 55 is substantially surrounded by two arc members or partial slip rings 65 and 66 mounted on the frame but insulated from it. Brush 69 on the hub contacts these members 65 and 66. Brush 69 is insulated from the hub and is electrically connected to photocell 58. Impulses received by the photocell as the spot of light passes mirrors 61 and 62 are carried by the brush 69 to arc 65 and wire 19c to start counting of the impulses and to arc 66 and wire 21c to stop the counting. Again, the number of impulses received along line 24 is a measure of the position of the rotary member.

The structure of Fig. 5 could be varied by having lights at the points 62 and 61, hooded to throw a narrow beam of light toward the center of the disc 4c. These beams through lens system 70 could activate a photocell to start and stop counting of the pulses generated in the system.

Fig. 7 shows a modification of Fig. 5 which could be used for reading an instrument having a rotary indicating needle 71 swinging over a dial 70. 72 represents a continuous annular mirror concentric with the dial and 73 represents an opaque interruption in the mirror at the zero point of the scale. Inclined mirror 75 on the disc 4c reflects light from mirror 60 over to mirror 72 and from there the light is reflected back again to mirrors 75 and 60. At the moment when the needle 71 coincides with its reflection in the mirror 72, as seen from 75, the interruption in the light can be used to activate a photocell, as at 58 in Fig. 5, to stop counting the pulses. When opaque portion 73 is passed by the beam of light another impulse on the photocell starts the counting. Thus the position of the needle can be determined with accuracy by the number of pulses generated while the beam of light is moving from the reference point to the needle.

Another modification, which would avoid the limitation on the range of movement of the rotary shaft which is imposed by the partial slip rings of Fig. 5, would be to use electrical members, as the variable capacitance of Fig. 1, or the pulse and magnetic pickoff of Fig. 3 to start the counting mechanism into operation and use a mirror, as at 62, Fig. 5, with its cooperating means to stop the counting. In such a case the rotary member 62 of Fig. 5 could have a full range of 360°, and the slip ring would be continuous.

The disc 4 could also be replaced by a disc on whose face or perpihery were recorded a series of equally spaced signals, said signals being recorded by any of the means known to the art of mechanical recording. In this embodiment, magnetic pickup head 15 would be replaced with any type of phonograph pickup head (and generally an associated amplifier), and the output of said phonograph pickup head (and/or amplifier) would be connected to wire 16.

A plurality of ways have been disclosed for generating the series of pulses used in the system and also a plurality of ways of utilizing the pulses to determine the amount of movement of a moving object. It is obvious that the various features disclosed can be combined in other ways than those shown to accomplish the advantages of the present invention.

While certain specific embodiments of the invention have been described by way of example, it should be understood that my invention is not limited thereto, but includes all the modifications and variations coming within the scope of the appended claims.

Having thus described my invention, I claim:

1. Means for determining the instantaneous position of a rotatable member comprising a rotating element coaxial with said member, means for generating a continuous series of equally spaced signals during the entire rotation of said element, a reference point, a counter, said instantaneous position of said member and said reference point constituting two control points for said counter, means cooperating with said element for generating a control pulse as said element passes each of said control points, means actuated by one of said pulses for starting transmission of said signals to said counter, means actuated by the other of said pulses for stopping said transmission of signals and means also actuated by said other of said pulses for delayingly resetting said counter to zero once in each rotation of said element.

2. Means for determining the variable angular position of a rotating element comprising a member rotating coaxially therewith, said element and member being constructed to form the plates of a variable capacitor and to give an impulse as one moves past the other, an object forming a reference point mounted adjacent the path of said member and constructed to form therewith a second variable capacitor and to give an impulse as said member passes thereby, means for generating a series of signals as said member rotates, a counter, a gate connected between said signal generating means and said counter and controlled to be opened by one of said impulses and closed by the other of said impulses and a delay element connected to receive said last named impulse and to transmit the same to said counter to reset the same to zero during each rotation of said member after a predetermined interval.

(References on following page)

References Cited in the file of this patent

UNITED STATES PATENTS

| | | |
|---|---|---|
| 2,168,149 | Arnold | Aug. 1, 1939 |
| 2,176,720 | Rayner et al. | Oct. 17, 1939 |
| 2,403,889 | Di Torro | July 9, 1946 |
| 2,420,509 | Whittaker | May 13, 1947 |
| 2,426,778 | Long | Sept. 2, 1947 |
| 2,431,591 | Snyder, Jr., et al. | Nov. 25, 1947 |
| 2,439,446 | Begun | Apr. 13, 1948 |
| 2,535,547 | Poch | Dec. 26, 1950 |
| 2,575,342 | Gridley | Nov. 20, 1951 |
| 2,609,439 | Marshall et al. | Sept. 2, 1952 |
| 2,623,936 | Kennedy et al. | Dec. 30, 1952 |
| 2,680,241 | Gridley | June 1, 1954 |